United States Patent
Gross et al.

(10) Patent No.: US 7,100,934 B2
(45) Date of Patent: Sep. 5, 2006

(54) GOOSE NECK TRAILER

(75) Inventors: Raymond Elias Gross, Killarney (CA); John Laurence Enns, La Salle (CA)

(73) Assignee: Precision Trailers Ltd., Killarney (CA)

( * ) Notice: Subject to any disclaimer, the term of this patent is extended or adjusted under 35 U.S.C. 154(b) by 0 days.

(21) Appl. No.: 10/969,218

(22) Filed: Oct. 21, 2004

(65) Prior Publication Data

US 2006/0082100 A1    Apr. 20, 2006

(51) Int. Cl.
  *B62D 53/00*  (2006.01)
  *B62D 53/06*  (2006.01)
(52) U.S. Cl. .................. 280/425.2; 280/441.2
(58) Field of Classification Search ............ 280/425.2, 280/441.2
  See application file for complete search history.

(56) References Cited

U.S. PATENT DOCUMENTS

| | | | | |
|---|---|---|---|---|
| 2,667,363 A | * | 1/1954 | Talbert | 280/441.2 |
| 2,717,707 A | * | 9/1955 | Martin | 414/475 |
| 2,822,945 A | * | 2/1958 | Duffy | 414/481 |
| 2,858,950 A | * | 11/1958 | Martin | 414/495 |
| 2,872,059 A | * | 2/1959 | Miller | 414/481 |
| 3,030,126 A | * | 4/1962 | Martin | 280/425.2 |
| 3,041,087 A | * | 6/1962 | Talbert | 280/425.2 |
| 3,326,572 A | * | 6/1967 | Murray | 280/441.2 |
| 5,040,815 A | * | 8/1991 | Evans | 280/425.2 |
| 6,874,803 B1 | * | 4/2005 | McDougall et al. | 280/441.2 |

* cited by examiner

*Primary Examiner*—Lesley D. Morris
*Assistant Examiner*—Marlon Arce-Diaz
(74) *Attorney, Agent, or Firm*—Adrian D. Battison; Michael R. Williams; Ryan W. Dupuis (57) ABSTRACT

A goose neck trailer with a pair of side rails has a goose neck hitch attached to the side rails and defined by two side members extending upwardly and forwardly therefrom and converging inwardly and forwardly to the hitch coupling with a series of cross-members interconnecting the side members to form an integral rigid structure. The side members are formed from two shaped plate elements including an inner plate element and an outer plate element both of which are bent to follow a generally parallel path with a space therebetween with each plate element being cut as an integral sheet portion from a sheet of metal and a varying space between the two plate elements being at least partly closed by a top cover plate and by a bottom plate each welded at its edges to the plate elements and leaving a bottom opening between the plates to receive the side rails.

14 Claims, 6 Drawing Sheets

GOOSE NECK TRAILER

This invention relates to a goose neck trailer and particularly to a novel construction of the goose neck hitch which extends from the side rails of the trailer to the hitch coupling.

BACKGROUND OF THE INVENTION

Typically goose neck trailers include a trailer frame having two side rails which are carried on suitable ground wheels and which provide support for whatever load carrying elements are required on the trailer.

The hitch section itself comprises a welded structure attached to the side rails at the forward end and extending there from upwardly and forwardly to a central hitch coupling at a position raised above the side rails and forwardly of the side rails.

Conventionally the hitch structure itself is formed from welded rectangular tubular members including side members which extend upwardly, forwardly and then generally inwardly to the coupling together with transverse connecting beams which form the hitch into a rigid structure.

The arrangement has been used conventional and widely for many years and is widely accepted. However opportunities remain for an improved structure which has potential advantages of improved strength, improved economies of manufacture and improved aesthetic appearance.

SUMMARY OF THE INVENTION

It is one object of the invention to provide a goose neck trailer having an improved construction of goose neck hitch.

According to one aspect of the invention there is provided a goose neck trailer comprising:

a trailer frame including a pair of side rails;

a goose neck hitch attached to a forward end of each of the side rails and extending therefrom to a center hitch coupling at a position forwardly from and at a height above the side rails;

the goose neck hitch comprising:

two side members each connected to a respective one of the side rails and having a first portion extending upwardly and forwardly therefrom and a second portion converging inwardly and forwardly to the hitch coupling;

and a plurality of cross-members interconnecting the side members to form an integral rigid structure;

the side members each being formed from two shaped plate elements including an inner plate element and an outer plate element both of which are bent to follow a generally parallel path with a space therebetween;

each plate element being cut as an integral sheet portion from a sheet of metal;

the space between the two plate elements being at least partly closed by a top cover plate welded at its edges to the two plate elements and by a bottom plate welded at its edges to the plate elements.

Preferably the space between the two side members varies along the length thereof.

Preferably the space between the two side members is increased at the respective side rail so as to receive the respective side rail therebetween.

Preferably the top cover plate and the bottom plate stop at a position spaced from a lower most edge of the side members so that the side members are open at the lowermost edge so as to receive the respective side rail therebetween.

Preferably the outer plate element is larger in width than the inner plate element at at least one position along the length of the plate elements such that an edge thereof extends beyond the top cover plate.

Preferably the side members define a raised horizontal section above the side rails and wherein at the raised horizontal section the outer plate element has a top edge which is higher than the inner plate element at such that an edge flange portion thereof extends beyond the top cover plate.

Preferably there are a plurality of rails connecting the side members at the horizontal section and where in the rails have a top surface substantially coincident with the top plate.

Preferably the edge flange portion includes a series of longitudinally spaced holes.

Preferably each of the side members includes a generally upwardly extending section at the bottom of which is attached the respective side rail and a generally horizontally extending section extending forwardly from a top of the vertical section and wherein each of the inner and outer plate elements has top and bottom edges which are smoothly curved from the generally upwardly extending section to the generally horizontally extending section.

Preferably each of the inner and outer plate elements is bent at a junction between the first and second portions of the side members.

Preferably each of the inner and outer plate elements increases in width at a junction between the generally horizontally extending section and the generally upwardly extending section.

Preferably the top and bottom plates are divided into separate sections along their length.

According to a second aspect of the invention there is provided a goose neck trailer comprising:

a trailer frame including a pair of side rails;

a goose neck hitch attached to a forward end of each of the side rails and extending therefrom to a center hitch coupling at a position forwardly from and at a height above the side rails;

the goose neck hitch comprising:

two side members each connected to a respective one of the side rails and having a first portion extending upwardly and forwardly therefrom and a second portion converging inwardly and forwardly to the hitch coupling;

and a plurality of cross-members interconnecting the side members to form an integral rigid structure;

the side members each including an outer plate element which is cut as an integral sheet portion from a sheet of metal;

wherein the side members each includes a generally upwardly extending section at the bottom of which is attached the respective side rail and a generally horizontally extending section extending forwardly from a top of the vertical section;

wherein the outer plate elements have top and bottom edges which are smoothly curved from the generally upwardly extending section to the generally horizontally extending section;

and wherein the outer plate elements are bent at a junction between the first and second portions of the side members.

According to a second aspect of the invention there is provided a goose neck trailer comprising:

a trailer frame including a pair of side rails;

a goose neck hitch attached to a forward end of each of the side rails and extending therefrom to a center hitch coupling at a position forwardly from and at a height above the side rails;

the goose neck hitch comprising:

two side members each connected to a respective one of the side rails and having a first portion extending upwardly and forwardly therefrom and a second portion converging inwardly and forwardly to the hitch coupling;

and a plurality of cross-members interconnecting the side members to form an integral rigid structure;

the side members each including an outer plate element which is cut as an integral sheet portion from a sheet of metal;

wherein the side members each includes a generally upwardly extending section at the bottom of which is attached the respective side rail and a generally horizontally extending section extending forwardly from a top of the vertical section;

a plurality of rails extending across between the side members in the generally horizontally extending section;

wherein the outer plate elements have, in the generally horizontally extending section, a top edge which is raised above a top surface of the rails to define an upwardly extending edge flange portion.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
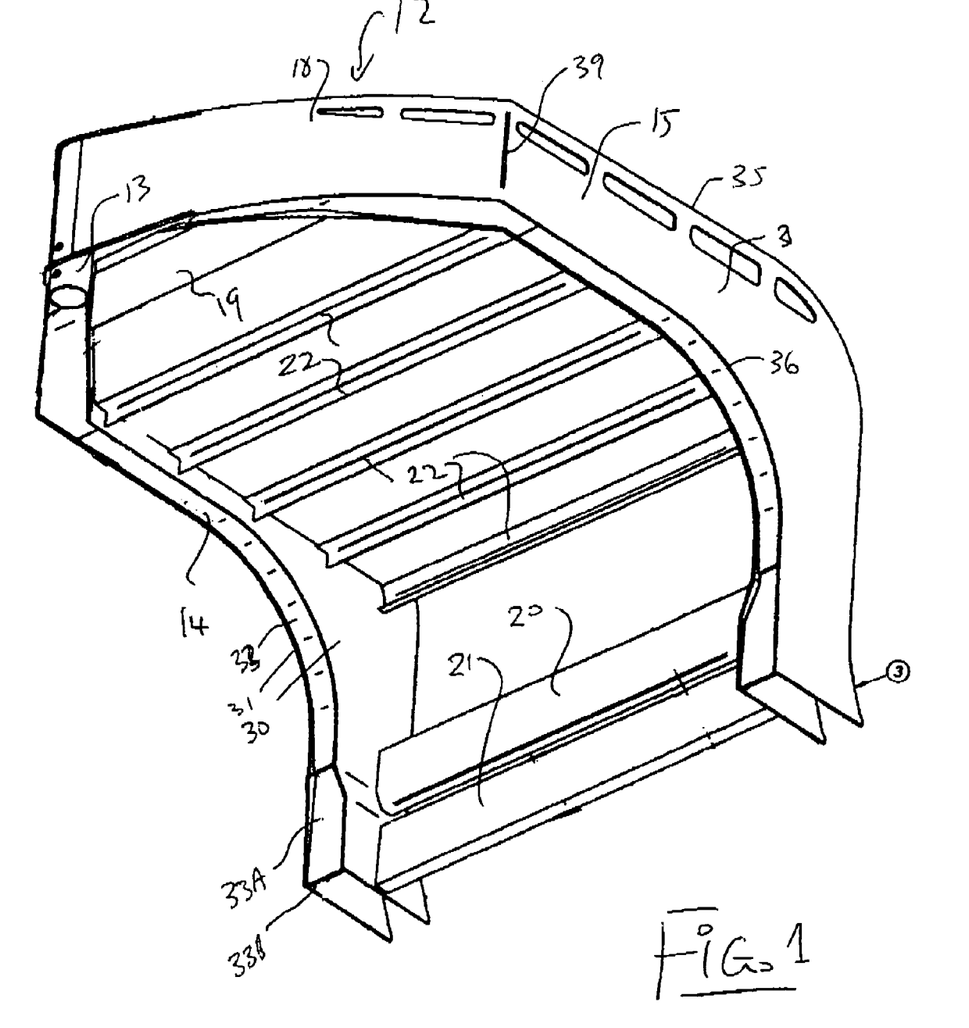
FIG. 1 is an isometric view from the bottom and one side of a hitch structure for the trailer according to the present invention.
Figure 2:
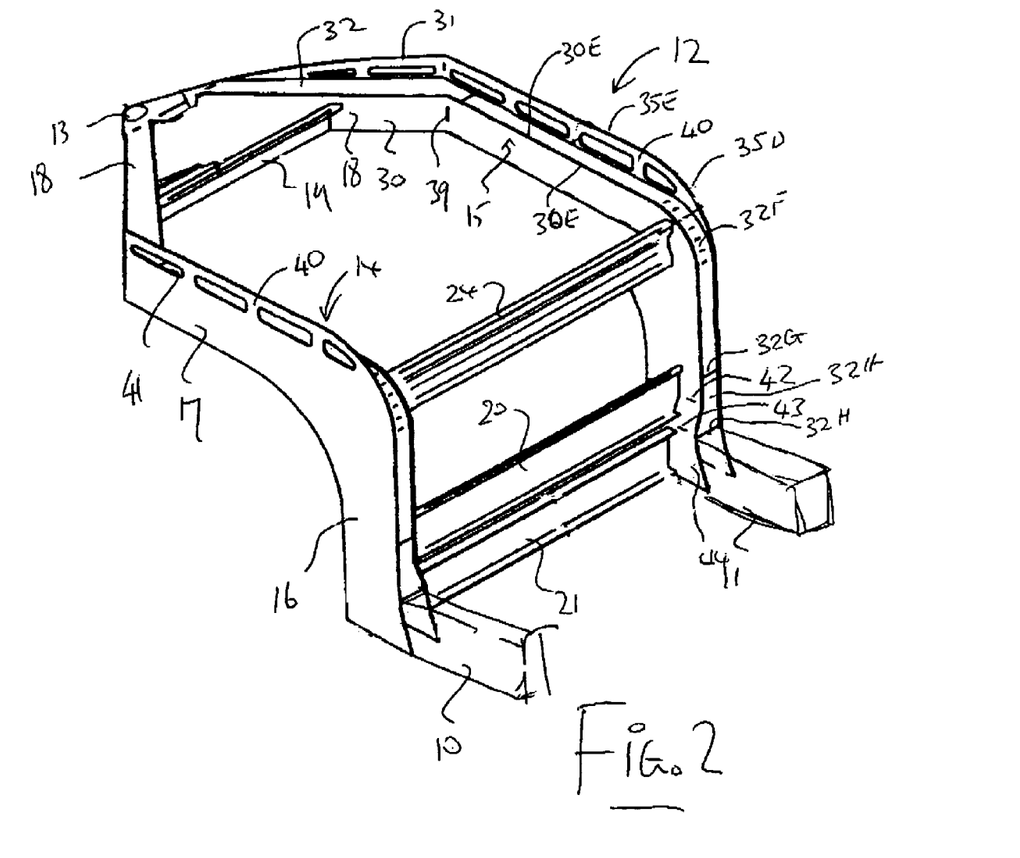
FIG. 2 is an isometric view from the top and one side of the hitch structure of FIG. 1 including the side rails of the trailer.
Figure 3:
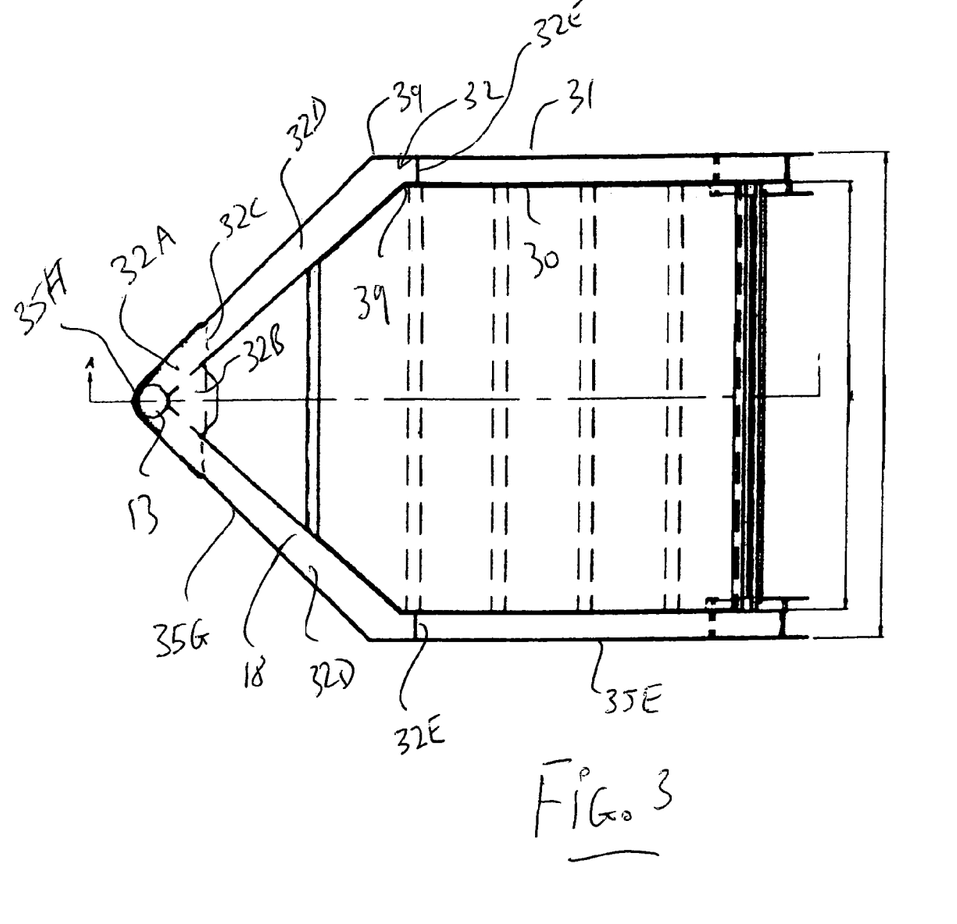
FIG. 3 is a top plan view of the hitch structure of FIG. 1.
Figure 4:
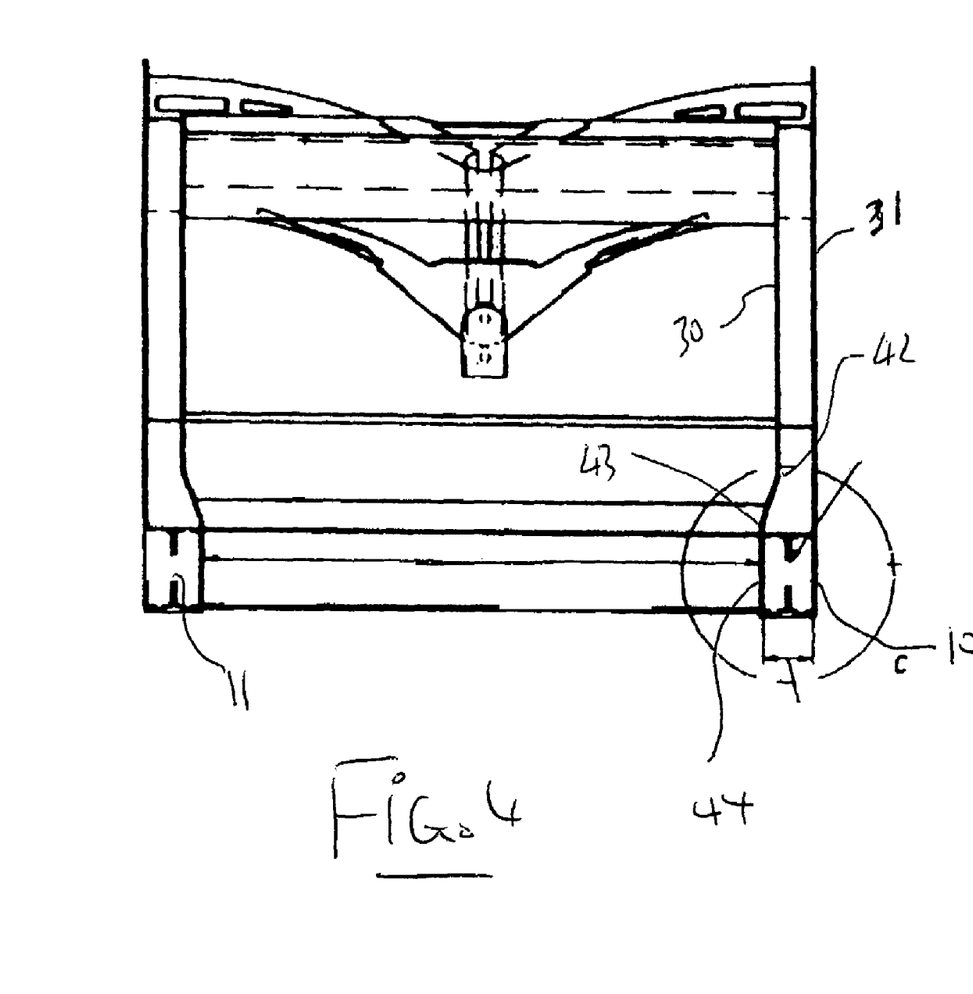
FIG. 4 is a front elevational view of the hitch structure of FIG. 1.
Figure 5:
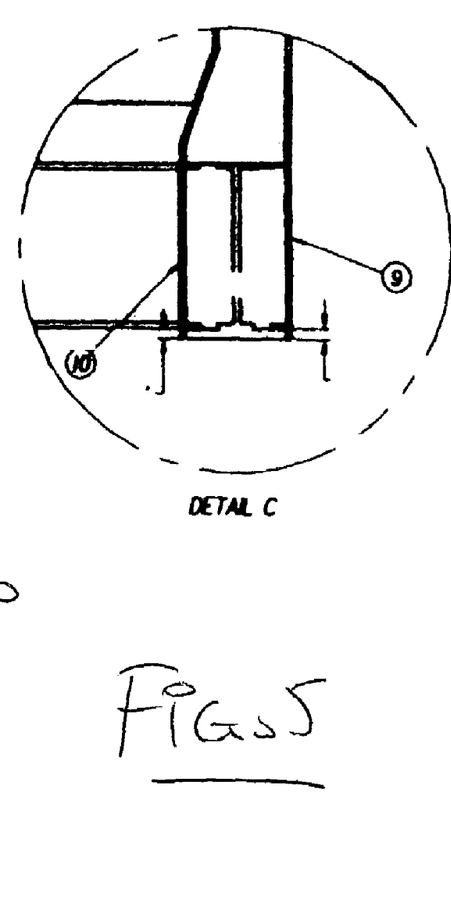
FIG. 5 is an enlarged front elevational view showing the connection of the side frame members to the bottom of the hitch structure.

Turning primarily to FIGS. 1 and 2, there is shown the front section of a trailer where the trailer itself is constructed of two side rails 10 and 11 which area attached at the forward end to a hitch construction 12 providing a hitch coupling 13 for the trailer. The hitch coupling is in the form of a tube or sleeve which engages over a suitable pin on the tractor vehicle. In general arrangements of this type are well known and are formed from welded tubular elements to form the required structure which has sufficient strength to communicate the loads from the side rails 10 and 11 of the trailer to the hitch coupling 13 sitting on the pin of the tractor.

The hitch construction forms a rigid integral structure defined by two side members 14 and 15 which include a first generally upstanding section 16, a second generally horizontal section 17 and a second portion defining a forwardly and inwardly extending portion 18 which extends from the width of the side rails 10 and 11 inwardly and forwardly to the hitch coupling 13.

In addition the side members 14 and 15 are interconnected by a plurality of transverse beams 19, 20 and 21 together with a plurality of transverse rails 22. The transverse beam 19 is arranged across the front portions 18 and is welded at its ends to the portions 18. The cross sectional shape of the transverse 19 can be selected as required depending upon the strength required and the in the embodiment shown it is angle iron. The transverse beams 20, 21 and 24 are located in the generally upstanding or vertical sections 16 with the transverse beam 20 being located to span across between the rails 10 and 11 on the inside of the side members. The transverse beam 20 is located just above the beam 21 and the transverse beam 24 is located at the top or the junction between the generally upstanding section 16 and the generally horizontal extending section 17. Again the shape of the beams 20, 21 and 24 can vary in dependence upon requirements and these may be tubular, I beams, channels or the like depending upon the structural requirements.

The rails 22 extend across between the horizontal section 17 and are formed as angle irons with a top horizontal flange of the angle iron in a top plane of the side members so as to form therewith a common horizontal surface for supporting decking. The vertical flange of the angle of each rail 22 extends vertically downwardly and the ends of the rails are welded to the inside surface of the side members.

Each of the side members is formed from an inner plate 30, an outer plate 31, a top cover plate 32 and a bottom plate 33. The two side members are identical and symmetrical so only one will be described. The outer plate 31 and the inner plate 30 are both formed from a singly element cut form a sheet metal plate so as to extend as a continuous sheet metal plate from the lower end at the rails to the upper end at the coupling. The outer plate 31 is cut to form an upper edge 35 and a bottom edge 36. As shown best in FIG. 6, the upper edge 35 commences at a flared portion 35A at the side rail so that bottom apex 35B is spaced along the rail from the main vertical portion 35C of the top edge 35. This defines an incline section 35A which increase the width of the bottom edge 37. The top edge 35 thus extends vertically upwardly in the vertical section 35C to a top curve 35D which smoothly turns from the vertical section 35C to the horizontal section 35E. The horizontal section 35E extends forwardly to the forward edge 38 of the horizontal portion at which there is a bend line 39 to form the second potion 18 which extends inwardly to the coupling 13. Thus rearwardly of the bend line 39 the remainder of the outer plate 31 lies in a common plane which is coincident with the plane of the outside surface of the rail.

Figure 6:
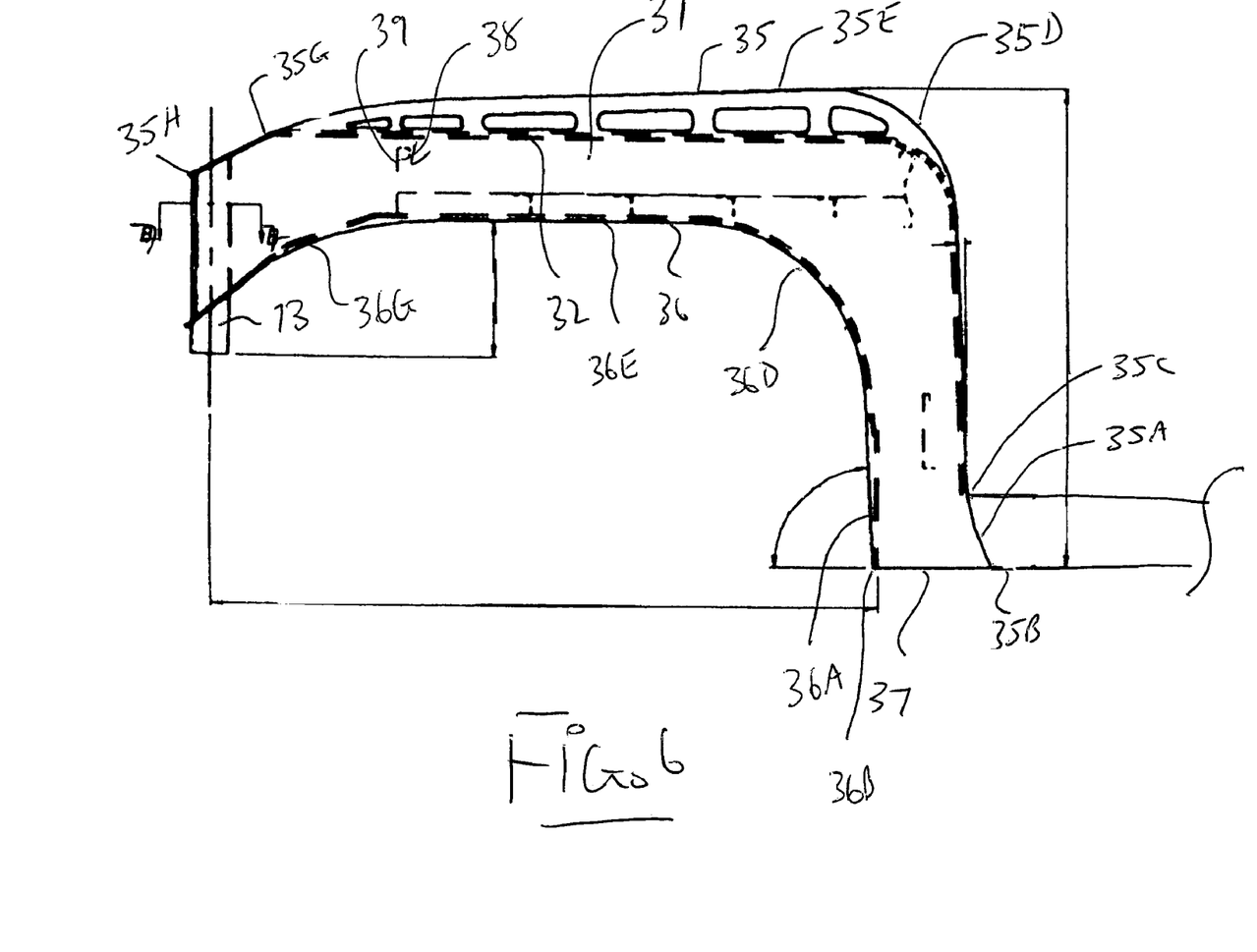
FIG. 6 is a side elevation view of the hitch structure of FIG. 1 and including the side rails of the trailer.
Figure 7:
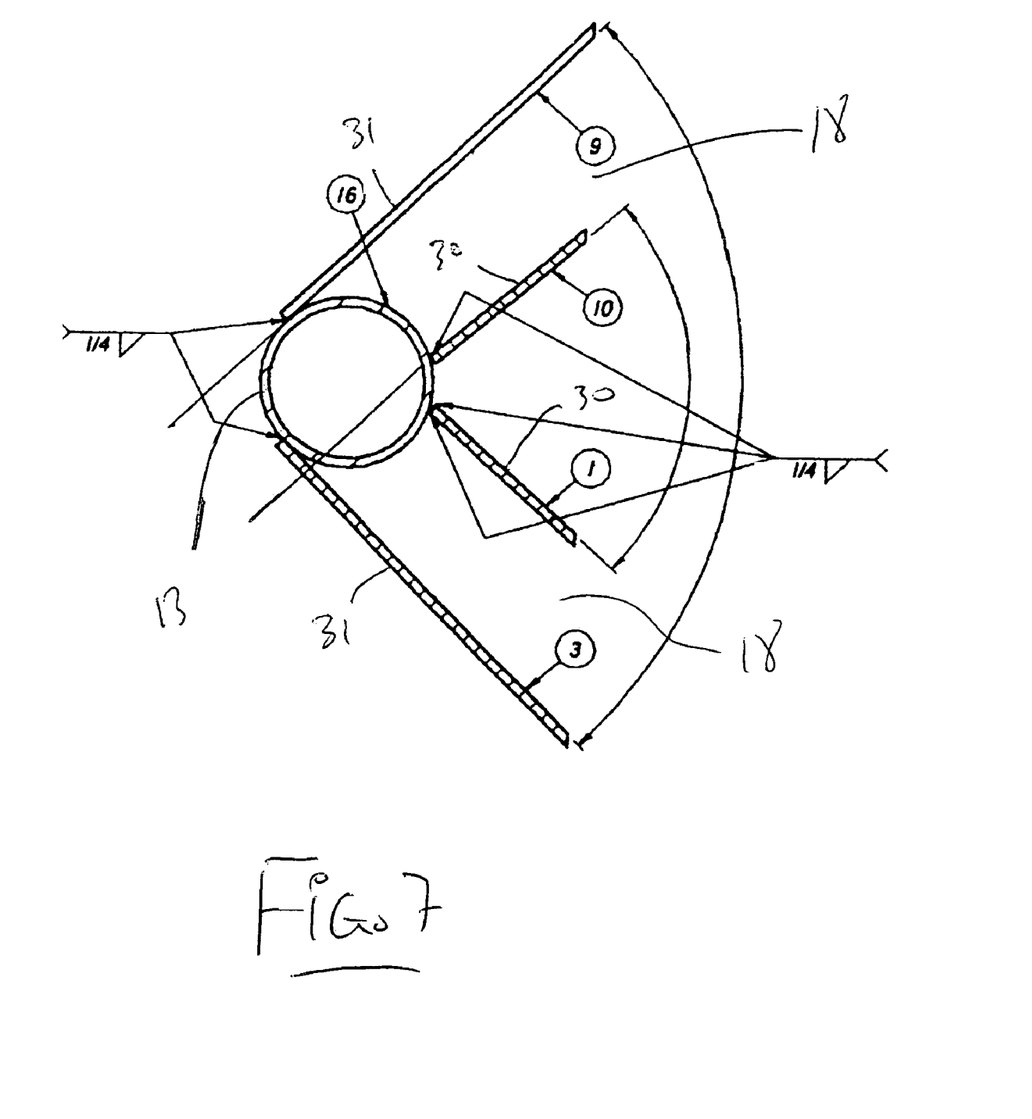
FIG. 7 is a cross sectional view along the lines 7—7 of FIG. 6 on an enlarged scale.

Forwardly of the bend line 39, the forward most portion of the plate 31 is also planar and extends inwardly in a portion 35G. As shown in FIG. 6, the portion 35G is inclined from the top edge portion 35E forwardly and downwardly to the coupling 13. Thus the apex 35H is below the height of the portion 35E of the top edge and located below the top surface of the rails 22 and the adjacent section of the top plate 32.

The bottom edge 36 generally follows the top edge 35. However the width of the plate varies along its length by different shaping of the bottom edge 33 relative to the top edge 35. Thus the top edge 36 includes a bottom section 36A adjacent the portion 35A but that portion does not follow the inclined shape of portion 35A so that the width of the plates increases toward apex 35B and the corresponding bottom apex 36B. In the vertical section the width remains substantially constant except that the curvature at the section 36D is of a larger radius so is curves more slowly thus increasing the width of the plate between the portion 35D and 36D so as to provide increase strength in this area. The bottom edge includes a further horizontal section 36E generally following the path of the top edge 35E extending again to the bend line 39. In the section in front of the bend line, the bottom edge 36G generally follows the top edge 35G to the coupling 13 but is inclined at a slightly greater angle downwardly so that the width of the plate slightly increases as it approaches the coupling 13. This again provides increased strength at the forward area.

The inner plate 30 follows substantially exactly the shape of the outer plate 31 with two exceptions. Firstly the top edge 30E in the horizontal section is lower than the top edge 35E so that the top edge 35E forms an upstanding flange portion 40 above the top plate 32 and the tope edge 30E. This flange portion is visible on the outside and covers edges of the decking extending across the cover plate 32 and the rails 22. The flange 40 commences at the portion 35D so that the curvature is slightly less than the curvature of the inner plate 30 thus causing the edge to rise to a height greater than the height of the edge 30E of the plate 30. The raised flange 40 continues to the bend line 39 and then gradually declines from a common height along the horizontal section to the forward end of the second portion 18 at the coupling 13. This provides an attractive appearance of the structure. Holes 41 are provided in the flange 40 at spaced positions along the flange again to provided an attractive appearance. The holes are elongate with bridge sections between the holes. End ones of the holes are shaped with inclined top edges to match the incline of the corresponding top edge of the flange.

The second difference between the inner plate and the outer plate is that the inner plate 30 is bent at a first bend line 42 and a second bend line 43 so that the spacing between the plates increases by an inclined section between the bend lines 42 and 43 and by a vertical section parallel to the outer plate 31 at the rails 10 and 11. Thus the outer plate 31 lies in a common plane with the outer surface of the rails where as the inner plate 30 is located outwardly of the inner surface of the rails with the bottom portion only below the bend line 43 and indicated at 44 inside the rail so as to be attached to the inside surface of the rail.

In addition the spacing between the outer plate 31 and the inner plate 30 is slightly modified at the bend lines 39 since the bind line 39 of the outer plate 31 is spaced slightly forward of the bend line 39 to the plate 30 thus increasing the spacing between the plates in the area at the rear of the second potion 18.

The top cover plate 32 is formed in a front section which covers the top of the second potion 18 and forms an apex section 32A at the coupling 13. The apex section 32A includes a rearwardly extending tab 32B rearward of the coupling 13. A bend line 32C is located at the forward end of the flange 40 since there is a bend at that point extending downwardly to the apex 35H. The top plate further includes rearwardly extending sections 32D which extend backwardly from the bend line 32C to the rear end of the second portion 18 to a rear edge 32E of the front cover plate portion. The V-shaped section is thus formed in one plate by cutting from sheet metal. The cover plate is then formed by a second section 32F which extends form the edge 32E rearwardly along the horizontal section of the side members and through the vertical section of the side members to a bottom edge 32G. The cover plate is finally formed by rear small section 32H which passes through the bend lines 42 and 43 and thus is shaped to match increase in width between the plates 30 and 31 at the bend lines 42 and 43. The bottom edge 32H is positioned to sit on top of the respective side rail.

The bottom plate is manufactured in similar sections matching the section previously described in respect of the top plate. However the bottom portion 33A of the bottom plate extends downwardly to a bottom edge 33B which is coincident with the bottom edges of the side plates 30 and 31 to close off the front of the side plates to the bottom to receive the rail behind the plate portion 33A.

Each of the plates 30, 31, 32 and 33 is individually formed from sheet metal by cutting and bending to the required shaped described above. Thus the sheet is initially planar and is cut to the required shape initially and then bent using commercially available equipment. The plates are then welded at the respective edges to form the side members each defined by a box section. However the box section structure thus form can take the complex shape set forth above to provide the attractive shape, strength characteristics and convenience of manufacture available from the cutting and bending techniques.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A goose neck trailer comprising:
a trailer frame including a pair of side rails;
a goose neck hitch attached to a forward end of each of the side rails and extending therefrom to a center hitch coupling at a position forwardly from and at a height above the side rails;
the goose neck hitch comprising:
two side members each connected to a respective one of the side rails and having a first portion extending upwardly and forwardly therefrom and a second portion converging inwardly and forwardly to the hitch coupling;
and a plurality of cross-members interconnecting the side members to form an integral rigid structure;
the side members each being formed from two shaped plate elements including an inner plate element and an outer plate element both of which are bent to follow a generally parallel path with a space therebetween;
each plate element being cut as an integral sheet portion from a sheet of metal;
the space between the two plate elements being at least partly closed by a top cover plate welded at its edges to the two plate elements and by a bottom plate welded at its edges to the plate elements;
wherein the space between the two plate elements is increased at the respective side rail so as to receive the respective side rail therebetween.

2. The trailer according to claim 1 wherein the top cover plate and the bottom plate stop at a position spaced from a lower most edge of the side members so that the side members are open at the lowermost edge so as to receive the respective side rail therebetween.

3. The trailer according to claim 1 wherein the outer plate element is larger in width than the inner plate element at least one position along the length of the plate elements such that an edge thereof extends beyond the top cover plate.

4. The trailer according to claim 1 wherein the plate elements define a raised horizontal section above the side rails and wherein at the raised horizontal section the outer plate element has a top edge which is higher than the inner plate element such that an edge flange portion thereof extends beyond the top cover plate.

5. The trailer according to claim 4 wherein there are a plurality of rails connecting the side members at the raised horizontal section and wherein the rails have a top surface substantially coincident with the top plate.

6. The trailer according to claim 4 wherein the edge flange portion includes a series of longitudinally spaced holes.

7. A goose neck trailer comprising:
a trailer frame including a pair of side rails;
a goose neck hitch attached to a forward end of each of the side rails and extending therefrom to a center hitch coupling at a position forwardly from and at a height above the side rails;
the goose neck hitch comprising:
two side members each connected to a respective one of the side rails and having a first portion extending upwardly and forwardly therefrom and a second portion converging inwardly and forwardly to the hitch coupling;
and a plurality of cross-members interconnecting the side members to form an integral rigid structure;
the side members each being formed from two shaped late elements including an inner plate element and an outer late element both of which are bent to follow a generally parallel path with a space therebetween;
each late element being cut as an integral sheet portion from a sheet of metal;
the space between the two plate elements being at least partly closed by a top cover plate welded at its edges to the two plate elements and by a bottom plate welded at its edges to the plate elements;
wherein each of the side members includes a generally upwardly extending section at the bottom of which is attached the respective side rail and a generally horizontally extending section extending forwardly from a top of the vertical section and wherein each of the inner and outer plate elements has top and bottom edges which are smoothly curved from the generally upwardly extending section to the generally horizontally extending section;
and wherein each of the inner and outer plate elements is inclined downwardly in the second portion toward the coupling.

8. The trailer according to claim 7 wherein each of the inner and outer plate elements is bent at a junction between the first and second portions of the side members.

9. The trailer according to claim 7 wherein each of the inner and outer plate elements increases in width at a junction between the generally horizontally extending section and the generally upwardly extending section.

10. The trailer according to claim 1 wherein the top and bottom plates are divided into separate sections along their length.

11. A goose neck trailer comprising:
a trailer frame including a pair of side rails;
a goose neck hitch attached to a forward end of each of the side rails and extending therefrom to a center hitch coupling at a position forwardly from and at a height above the side rails;
the goose neck hitch comprising:
two side members each connected to a respective one of the side rails and having a first portion extending upwardly and forwardly therefrom and a second portion converging inwardly and forwardly to the hitch coupling;
and a plurality of cross-members interconnecting the side members to form an integral rigid structure;
the side members each including an outer plate element which is cut as an integral sheet portion from a sheet of metal;
wherein the side members each includes a generally upwardly extending section at the bottom of which is attached the respective side rail and a generally horizontally extending section extending forwardly from a top of the vertical section;
wherein the outer plate elements have top and bottom edges which are smoothly curved from the generally upwardly extending section to the generally horizontally extending section;
and wherein the outer plate elements are bent at a junction between the first and second portions of the side members;
wherein the outer late elements increase in width at a junction between the generally horizontally extending section and the generally upwardly extending section.

12. The trailer according to claim 11 wherein each of the inner and outer plate elements is inclined downwardly in the second portion toward the coupling.

13. A goose neck trailer comprising:
a trailer frame including a pair of side rails;
a goose neck hitch attached to a forward end of each of the side rails and extending therefrom to a center hitch coupling at a position forwardly from and at a height above the side rails;
the goose neck hitch comprising:
two side members each connected to a respective one of the side rails and having a first portion extending upwardly and forwardly therefrom and a second portion converging inwardly and forwardly to the hitch coupling;
and a plurality of cross-members interconnecting the side members to form an integral rigid structure;
the side members each including an outer plate element which is cut as an integral sheet portion from a sheet of metal;
wherein the side members each includes a generally upwardly extending section at the bottom of which is attached the respective side rail and a generally horizontally extending section extending forwardly from a top of the vertical section;
a plurality of rails extending across between the side members in the generally horizontally extending section;
wherein the outer plate elements have, in the generally horizontally extending section, a top edge which is raised above a top surface of the rails to define an upwardly extending edge flange portion.

14. The trailer according to claim 13 wherein the edge flange portion includes a series of longitudinally spaced holes.

* * * * *